United States Patent [19]

Starkweather

[11] 4,027,961
[45] June 7, 1977

[54] COPIER/RASTER SCAN APPARATUS

[75] Inventor: Gary K. Starkweather, Saratoga, Calif.

[73] Assignee: Xerox Corporation, Stamford, Conn.

[22] Filed: Apr. 6, 1976

[21] Appl. No.: 674,253

[52] U.S. Cl. .................................. 355/3 R; 355/11; 358/300

[51] Int. Cl.² ....................................... G03G 15/00

[58] Field of Search ................ 355/3 R, 11, 20, 46, 355/75; 178/6.6 A, 6.7 R

[56] References Cited

UNITED STATES PATENTS

| | | | |
|---|---|---|---|
| 3,523,725 | 8/1970 | Schaeffer | 355/46 X |
| 3,681,527 | 8/1972 | Nishiyama et al. | 178/6.6 A |

Primary Examiner—Richard L. Moses
Attorney, Agent, or Firm—M. J. Colitz; T. J. Anderson; L. Zalman

[57] ABSTRACT

An apparatus which can function either in a copier mode or in a raster scan mode. A first unit of the apparatus, containing elements to produce an information modulated, scanning light beam, is movably mounted upon a second unit of the apparatus, containing optical elements for directing light upon a photosensitive medium, such that the movable unit can be located clear of the document supporting platen of the second unit to provide copier operation or can be located immediately adjacent the platen of the second unit to provide raster scanning operation. Optical means are provided in the movable unit to provide light focusing capabilities for the raster scan mode of operation.

8 Claims, 2 Drawing Figures

COPIER/RASTER SCAN APPARATUS

BACKGROUND OF THE INVENTION

Until recent years, most document storage and transmission was in the form of hard copy, such as a printed page of text. To meet the need for multiple copies of such hard copy, copy machines were successfully developed. In the most commercially successful type of copying machine, a light image of a hard copy original to be reproduced is projected onto the sensitized surface of a xerographic plate or belt to form an electrostatic image. Thereafter, the latent image is developed with toner material to form a xerographic powder image corresponding to the latent image on the plate or belt surface. The powder image is then electrostatically transferred to a record material, such as a sheet or web of paper or the like, to which it may be fused by a fusing apparatus whereby the powder image is caused permanently to adhere to the surface of the record material.

Man's inability to keep abreast of the ever increasing volume of information now being generated, the development of data processing equipment, and the desire to transmit information more quickly to remote utilization areas has led to the advance of digital computation, storage, transmission and printing techniques. In the area of digital printing, flying spot scanning systems have been used for communicating video information to a scanned light sensitive medium. In such scanning systems, a light beam produced from a source such as a laser is reflected from a surface of a rotating polygon or multifaced mirror to provided a raster scan across a light sensitive surface. The light beam is modulated in accordance with a binary code which represents image information such as alphanumeric characters or the like, with the binary code being accessed from a magnetic disk or tape, provided directly from the output of a computing device, or provided from a remote document scanning device.

With the increased utilization of digital printing, many environments, such as the business office, are called upon to produce a hard copy output from both a hard copy input and a digitally encoded signal representative of video information. At present, this dual capability requires separate copier and raster scanning apparatus, each with its own light responsive medium and projection optics.

OBJECTS OF THE INVENTION

It is an object of the present invention to provide an apparatus capable of producing hard copy output in response to both hard copy input and raster scanning.

It is a further object of the present invention to provide an apparatus having copying capabilities and raster scanning capabilities.

SUMMARY OF THE INVENTION

In accordance with the invention, an apparatus is provided which utilizes a common optical path for both copying and raster scanning. For copying, a hard copy of the information to be reproduced is placed upon a light transparent platen, with exposure resulting in the projection of a light image onto a photosensitive plate, drum or film via a path including one or more mirrors and a projection lens. For raster scanning, a scanning unit, containing a source of high intensity light and means to modulate and scan the light beam produced by that source, is positioned, by either rotation or translational movement thereof, adjacent the light transparent platen. The scanning unit also includes a field lens at or near the platen to direct the modulated and scanned light beam to the entrance pupil of the projection lens for projection of that light beam onto the photosensitive plate, drum or film. By providing a movable scanning unit which can input directly to the same projection lens used for copying, a basic copier can be used for either raster scanning or copying, with this dual purpose utilization being achieved without changes in the copier optical path or its image development apparatus.

DETAILED DESCRIPTION OF THE INVENTION

Figure 1:
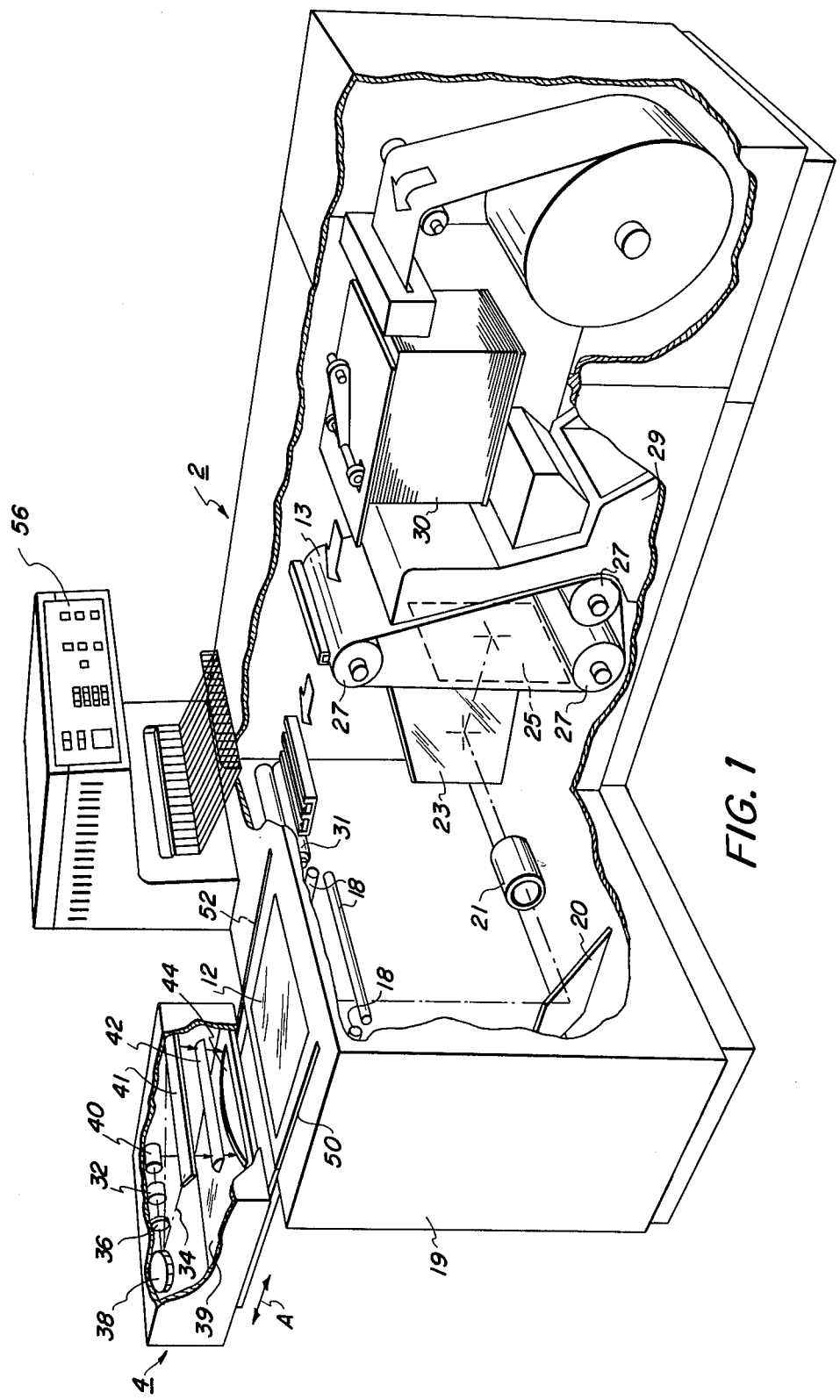
FIG. 1 is a perspective, partially cut away view of a copying/raster scanning apparatus in accordance with the invention in one mode of operation thereof.

Referring now to FIG. 1, there is shown an embodiment of a copier/raster scanning apparatus in accordance with the invention which includes a fixed xerographic processor unit indicated by the reference numeral 2 and a movable raster scanning unit indicated by the reference numeral 4. The xerographic processor is arranged as aself-contained unit having all of its processing stations located in a unitary enclosure or cabinet. The xerographic processor unit includes an exposure station having a transparent platen 12 on which a document to be reproduced is positioned for optical projection onto a photoconductive surface in the form of a xerographic belt 13. Imaging light rays from the document to be reproduced, which is flash-illuminated by lamps 18, are projected by a first mirror 20, a projection lens 21 and another mirror 23 onto the xerographic belt 13 at the focal plane for the lens 21 at a position indicated by the dotted line 25.

The xerographic belt 13 is mounted for movement around three parallel arranged rollers 27 suitably mounted in the processor unit 2. The belt 13 may be continuously driven at an appropriate speed by a suitable motor (not shown). Exposure of the belt to the imaging light rays from the document discharges the photoconductive layer in the areas struck by light whereby there remains on the belt 13 an electrostatic latent image corresponding to the light image projected from the document. As the belt 13 continues its movement, the electrostatic latent image passes a developing station at which there is positioned a developer apparatus 29 for developing the electrostatic latent image. After development, the powdered image is moved to an image transfer station whereat record material or a sheet of paper just previously separated from a stack of sheets 30 is held against the surface of the belt 13 to receive the developed powder image therefrom. The sheet is moved in synchronism with the movement of the belt 13 during transfer of the developed image. After transfer, the sheet of paper is conveyed to a fusing station where a fuser device 31 is positioned to receive the sheet of paper for fusing the powder thereon. After fusing of the powder image, the sheet is conveyed through an opening in the processor unit to a limitless collating apparatus (not shown). Further details of the processing devices and stations in the copier apparatus may be found in U.S. Pat. Nos. 3,661,452, 3,597,071, and 3,884,408, which are commonly assigned with the present invention.

When the copier/raster scanning apparatus is utilized as a copier, the raster scanning unit 4 is displaced from the platen 12, as shown in FIG. 1, such that the platen 12 is available to receive a document for copying. The raster scanning unit 4 includes a light source 40, preferably a laser, which generates a collimated beam of monochromatic light which is modulated by modulator 32 in accordance with the information content of a video signal. Modulator 32 may be any suitable electro-optical modulator for recording the video information in the form of a modulated light beam at the output of the modulator 32. The modulator 32 may be, for example, a Pockels cell comprising a potassium dihydrogen phosphate crystal, whose index of refraction is periodically varied by the application of the varying voltage which represents the video signal. The video signal conveys information in a conventional manner, with binary pulse code modulation or wide-band frequency code modulation being examples. In any event, by means of the modulator 32 the information within the video signal is represented by a modulated light beam.

The modulated light beam is focused by focusing optics, represented pictorially by lens 36, with the focused beam impinging upon a facet of an optical spinner, represented by a scanning polygon 38 which has highly reflective or mirrored facets. With rotation of the polygon 38 by means of a motor (not shown) the modulated light beam is reflected from the facet or facets of the polygon upon which it impinges and turned through a scan angle for flying spot scanning. Alternatively, flying spot scanning could be provided by any other suitable device, such as mirrored piezoelectric crystals or planar reflecting mirrors which are driven in an oscillatory fashion. The modulated, scanning light beam 34 is projected by a mirror system, represented by mirror 41, such that it is incident upon a correction cylinder 42 which corrects distortions in the raster scan due to irregularities in the movement or orientation of the facets of the rotating polygon 38. Light passing through correction cylinder 42 is incident upon a field lens 44, for providing focusing as will be described hereinafter.

Figure 2:
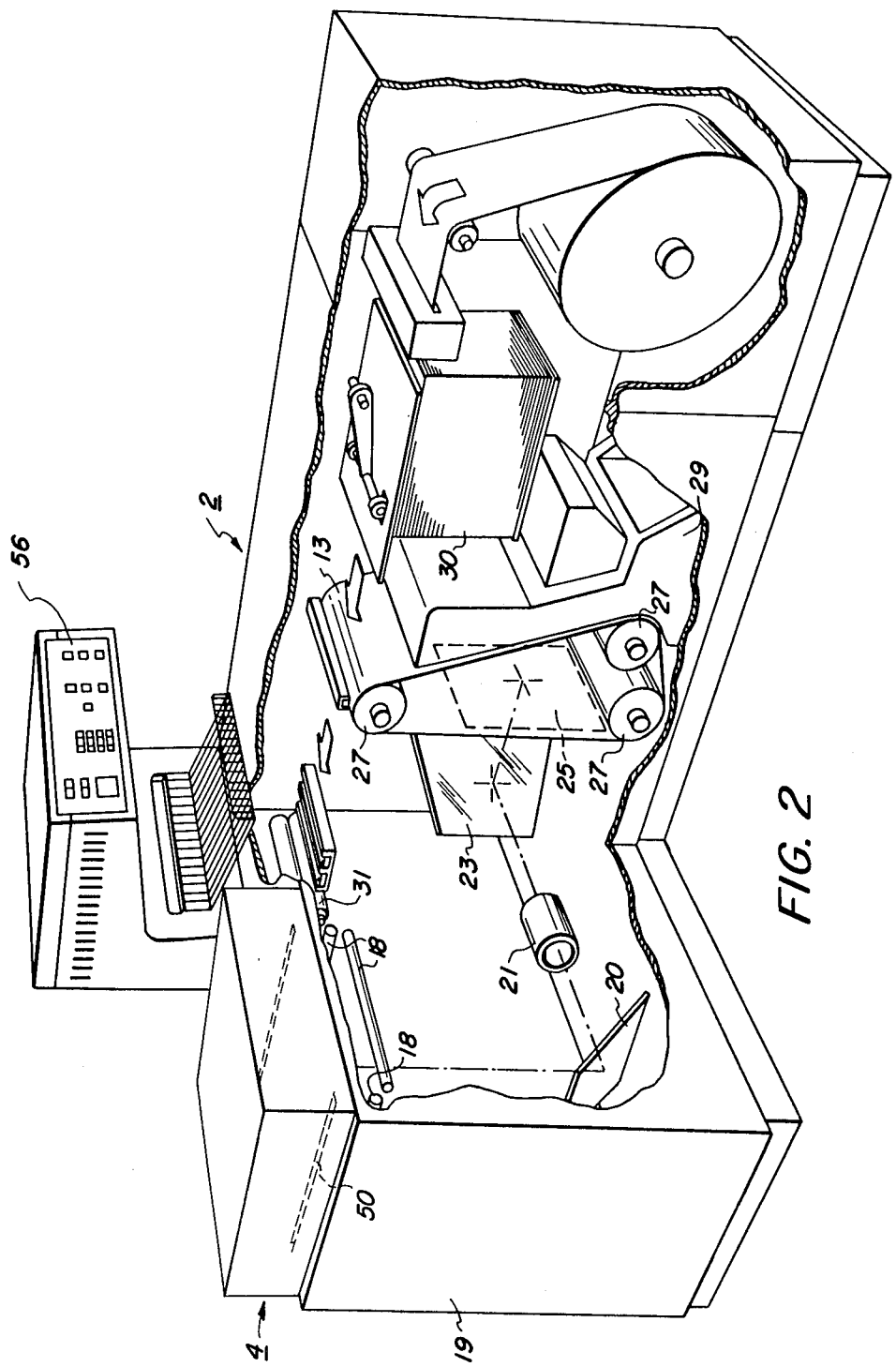
FIG. 2 is a perspective, partially cut away view of a copier/raster scanning apparatus in accordance with the invention in a mode of operation different from that illustrated in FIG. 1.

As noted, the apparatus of FIG. 1 is shown in the configuration in which it would function as a copier wherein a document placed upon the platen 12 is illuminated by flash lamps 18 to provide, via mirrors 20 and 23 and lens 21, an optical image on a portion of belt 13. As also noted, when the apparatus of FIG. 1 is in the configuration in which it would function as a copier, the raster scanning unit 4 is displaced from the platen 12. Support for the raster scanning unit is provided, for example, by tracks 50 and 52 which are rigidly connected to the xerographic processor unit 2 adjacent the sides of the platen 12. On the underside of the raster scanning unit 4 are provided rollers or equivalent translating devices (not shown) which ride within or upon the tracks 50 and 52 to permit movement of the raster scanning unit 4 in the directions shown by arrow A. When it is desired to operate the apparatus of FIG. 1 in a raster scanning mode, the raster scanning unit 4 is slid forward until it is positioned over the platen 12, as shown in FIG. 2. Latching means, detents or other stops (not shown) may be used to maintain the raster scanning unit 4 in either its FIG. 1 or FIG. 2 positions. When in the raster scanning mode, the modulated, scanning light beam 34 passes through the optically transparent bottom wall 39 of the raster scanning unit 4 and then through the transparent platen 12, whereafter it follows the optical path provided by mirrors 20 and 23 and lens 21 to provide a focused spot of light at belt 19. In order to provide a focused spot of light at belt 19, the field lens 44 must be of such configuration or design that the light incident thereon is focused at the entrance pupil of lens 21.

Although the field lens 44 is shown as a single element lens, it is contemplated that the field lens can have a multi-lens structure. Also, as described, when the apparatus includes a copier unit 4 that utilizes flash illumination, the field lens is stationary throughout the raster scan. If, when the apparatus is used as a copier, the copier unit uses a moving illumination system to illuminate a document on the platen 12, the field lens 44 would be moved in synchronism with movement of the illumination system when the apparatus is used as a raster scanner.

From the foregoing description, it is clearly shown that copy and raster scanning operational modes can be readily achieved by the disclosed apparatus due to the movable nature of the raster scanning unit 4. Although the raster scanning unit has been described as movable on a track arrangement, other arrangements for allowing the raster scan unit to be positioned directly over or remote from the platen are contemplated. For example, the raster scanning unit can be hinged such that it can be rotated into a position directly over the platen when it is desired to provide raster scanning.

Synchronization between raster scanning and movement of the belt 13 is achieved in a conventional manner. For example, a common start switch on panel 56 could be utilized to simultaneously activate raster scanning unit 4 and to initiate movement of belt 13.

I claim:

1. An apparatus capable of producing output information in hard copy form from more than one type of input information comprising:
    a first unit including a light transparent platen, a photoreceptor, a light source, and optical means including a lens for projecting the information content of a document placed on said platen onto a portion of said photoreceptor,
    a second unit including means for producing an information modulated, spot size, high intensity beam of light, and means for providing line scanning movement of said beam of light, and
    means for mounting said second unit on said first unit such that said second unit can be positioned (1) over said platen whereby a portion of said photoreceptor receives information in accordance with said information modulated beam of light or (2) remote from said platen whereby said platen can receive a document such that the information content of said document can be projected onto a portion of said photoreceptor,
    said second unit further including optical means for projecting said information modulated beam of light onto the entrance pupil of said processor lens.

2. The apparatus of claim 1 wherein said optical means of said second unit is a field lens.

3. The apparatus of claim 1 wherein said means for mounting provides for rotational movement of said second unit over said platen.

4. The apparatus of claim 1 wherein said means for mounting provides for translational movement of said second unit over said platen.

5. An apparatus capable of producing output information in hard copy form from more than one type of input information comprising:
- a first unit including a light transparent platen, a photoreceptor, a light source, and optical means including a lens for projecting the information content of a document placed on said platen onto said photoreceptor,
- a second unit including means for producing an information modulated, spot size, high intensity beam of light, and means for providing line scanning movement of said beam of light, and
- means for mounting said second unit on said first unit such that said second unit can be positioned (1) over said platen whereby said photoreceptor receives information in accordance with said information modulated beam of light or (2) remote from said platen whereby said platen can receive a document such that the information content of said document can be projected onto said photoreceptor,
- said second unit further including optical means for projecting said information modulated beam of light onto the entrance pupil of said processor lens.

6. The apparatus of claim 5 wherein said optical means of said second unit is a field lens.

7. The apparatus of claim 5 wherein said means for mounting provides for rotational movement of said second unit over said platen.

8. The apparatus of claim 5 wherein said means for mounting provides for translational movement of said second unit over said platen.

* * * * *